United States Patent [19]
Gable et al.

[11] Patent Number: 5,546,834
[45] Date of Patent: Aug. 20, 1996

[54] TOOL FOR REMOVING THREADED FASTENERS

[76] Inventors: Jack Gable; Doug Harrington, both of 6900 Valley View, Bakersfield, Calif. 93306

[21] Appl. No.: 509,553

[22] Filed: Apr. 16, 1990

[51] Int. Cl.$^6$ .................................................. B25B 13/50
[52] U.S. Cl. .................................................. 81/53.2
[58] Field of Search .................... 81/53.2, 441; 29/426.1

[56] References Cited

U.S. PATENT DOCUMENTS

| | | | |
|---|---|---|---|
| 2,408,450 | 10/1946 | Schrader | 81/53.2 |
| 2,851,768 | 9/1988 | Ellis | 81/53.2 X |
| 3,096,574 | 7/1963 | Hillberg | 81/53.2 X |
| 3,290,968 | 12/1966 | Parnock et al. | 81/53.2 |

*Primary Examiner*—D. S. Meislin
*Attorney, Agent, or Firm*—Lyon & Lyon

[57] ABSTRACT

A tool for removing threaded fasteners includes a threaded bracket and a remover having a driver and an engager. The driver has a first threaded section engageable to the bracket and a second threaded section of larger pitch threadably engaged to the engager. A stop limits relative rotation between the driver and engager. The intersection of the threads between the driver and bracket and the driver and engager forcibly engages the engager into the threaded article to be removed and maintains engaging pressure against it as the driver is initially backed out of the bracket.

20 Claims, 7 Drawing Sheets

TOOL FOR REMOVING THREADED FASTENERS

BACKGROUND OF THE INVENTION

The present invention relates generally to tools for removing threaded fasteners.

It can be difficult to remove a nut, stud, sleeve or similar fastener after it has become frozen in place over time because of heat, strain and/or corrosion. The difficulty in removal is compounded when the fastener has a threaded cylindrical outer surface, making the vital step of obtaining a satisfactory grip on the object substantially more arduous. Even more difficult is the removal of a threaded collar or fastener which is screwed onto a threaded stud which must not be damaged in the removal of the fastener, e.g., in removing a bud nut on a truck or other vehicle.

The conventional method of removing such a fastener involved the application of heat with e.g., an acetylene torch in combination with the application of whatever brute mechanical force can be applied. If this fails, the threaded collar may be burned off using an acetylene cutting torch. Alternatively, where the threaded collar is a bud nut on a stud on the hub of a track, it can be removed by removing the hub assembly from the axle of the truck and unbolting the stud from the brake drum.

A frequent requirement for removing a frozen or damaged fastener is on the wheels of large trucks which have threaded studs bolted onto wheel hubs. Bud nuts are used in part to prevent damage to these threaded studs. A bud nut is essentially a hollow cylinder threaded on the inside (to screw onto a stud) and threaded on the outside (allowing the wheel of the truck to be placed over the bud nut, with a lug nut being screwed onto its threaded exterior to secure the wheel on the hub). Each but nut has a radially outwardly extending shoulder on its bottom end. The shoulder fits into a beveled aperture in the truck wheel rim.

But nuts are frequently damaged when the inner rim is removed (e.g., to repair or replace a tire). The bud nuts must then be removed and replaced. A square gripping surface at the top of the bud nut is provided to facilitate installation and removal of the bud nut. The square gripping surface is smaller than the diameter of the outer threaded surface of the bud nut to allow a lug nut to be installed onto the bud nut. Unfortunately, due to the high forces involved, the square gripping surface often breaks off of the bud nut, leaving only a short cylinder or segment portion of the bud nut (threaded on the inside and outside) screwed onto the stud. It is then exceptionally difficult to remove this remaining segment of the bud nut without damaging the stud.

As a further complication, the studs on the wheel hubs on the left (or drivers) side of a truck have left hand threads whereas the studs on the wheel hubs on the right (or passenger) side of a truck have right hand threads. Therefore bud nuts may have either left hand thread or right hand thread, depending on which side of the truck they are used on. Consequently, removal capability in both directions is necessary.

It is therefore an object of the invention to provide a tool for removing threaded fasteners.

It is another object of the invention to provide a tool which will easily remove even a bud nut which is broken off near the radially outwardly extending shoulder at the bottom thereof.

It is a further object of the invention to provide a tool capable of gripping a minimal remaining portion of a bud nut without damaging the threads on the threaded stud on which the bud nut is mounted.

It is yet another object of the present invention to provide such a tool which has a minimal number of parts, is sturdy in construction and highly durable, while remaining relatively simple and economical to manufacture and use.

SUMMARY OF THE INVENTION

To this end, a tool for removing threaded articles and in particular bud nuts includes a threaded bracket and a remover including a driver and an engager. The driver has a first threaded section threadably engageable to the bracket. The first threaded section matches the pitch of the threads of the fastener being removed. A second threaded section of the driver has threads of a larger pitch than the threads of the first threaded section. The engager is threadably engaged to the second threaded section of the driver. A limiter limits relative rotation between the driver and engager.

Preferably, the driver has a hexagonal tail cap and the engager has an indenting engaging surface. The limiter for limiting relative rotation between the driver and engager most desirably includes a collar sector and a stop. The collar sector can be provided on the driver or the remover. The bracket preferably has flanges with through holes for mounting the bracket over the article to be removed.

Also to this end, a method for removing a threaded article comprises the steps of securing a threaded bracket in alignment with the threaded article. A remover having a driver and an engager is turned in a forward direction through the threaded bracket causing an engager at one end of the remover to forcibly engage the article. The remover is then turned in the reverse direction and is simultaneously further driving the engager against the article, through the interaction of threads of different pitch connecting the engager and driver, and the driver and threaded bracket. This causes the article to turn in the reverse direction with the engager remaining tightly clamped against the article, permitting its removal.

The bracket has three holes, two outer holes which fasten to the existing but nuts on both sides of the broken but nut. The center hole has threads so that the body or driver and head or engager may be positioned over the broken but nut and threaded in a forward and backward motion so the broken bud nut can be removed. The bracket is designed to withhold up to 2,000 pounds or torque and pressure.

When a bud nut is broken, the bracket is mounted to the inner rim on the existing bud nuts on both sides of the broken bud nut to be removed. There are left and right hand threaded bud nuts. By way of example, to remove a left hand bud nut, the left hand body or driver is inserted into the center hole of the bracket (upper threads). When the left hand body is in the bracket, it is turned in the direction opposite to the direction in which the bud nut would be removed.

The stop is against a first position (A) when it is to be tightened against the flange of the bud nut. The stop against this position (A) allows the head or engager not to tighten against the body therefore allowing it to free wheel. Then this rotation is reversed to the direction that the bud nut is to be removed. The head stays in a stationary position(i.e., it does not turn). The threads on the bottom of the body are of a larger pitch than the top of the body. This creates a two to one ratio therefore forcing the head into the flange of the bud nut. The amount of this forcing is determined by the gap in the head. When rotating to a second potion (B) the body switches power from downward or inward against the flange of the bud nut, to turning in the direction to remove the bud nut.

BRIEF DESCRIPTION OF THE DRAWINGS

Other objects and features of the invention will become apparent from the following detailed description taken in connection with the accompanying drawings. It is to be understood, however, that the drawings are designed for the purpose of illustration only and are not intended as a definition of the limits of the invention.

In the drawings, wherein similar reference characters denote similar elements throughout the several views.

DETAILED DESCRIPTION OF THE PREFERRED EMBODIMENT

Figure 1:
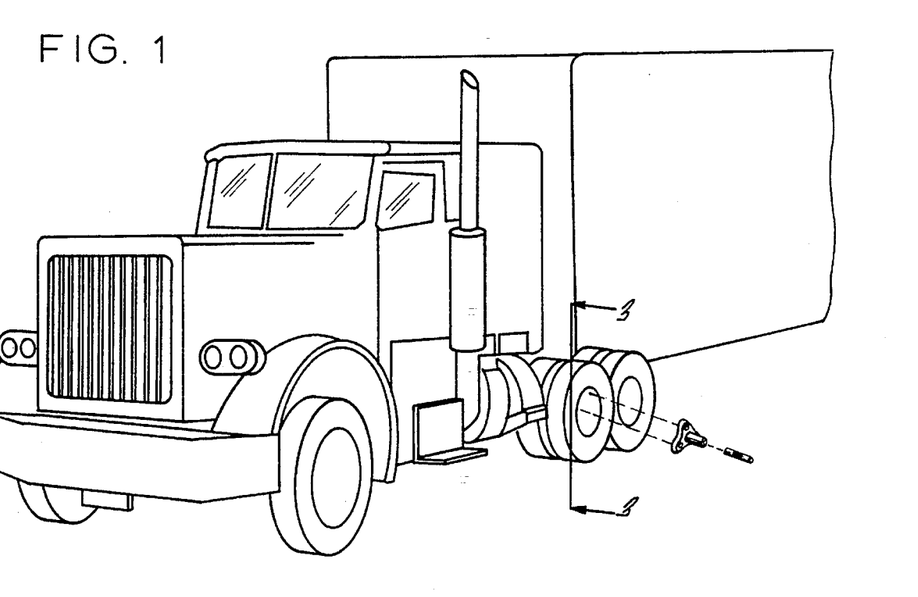
FIG. 1 is a perspective view of a tractor, semi-trailer unit having tandem wheels.
Figure 2:
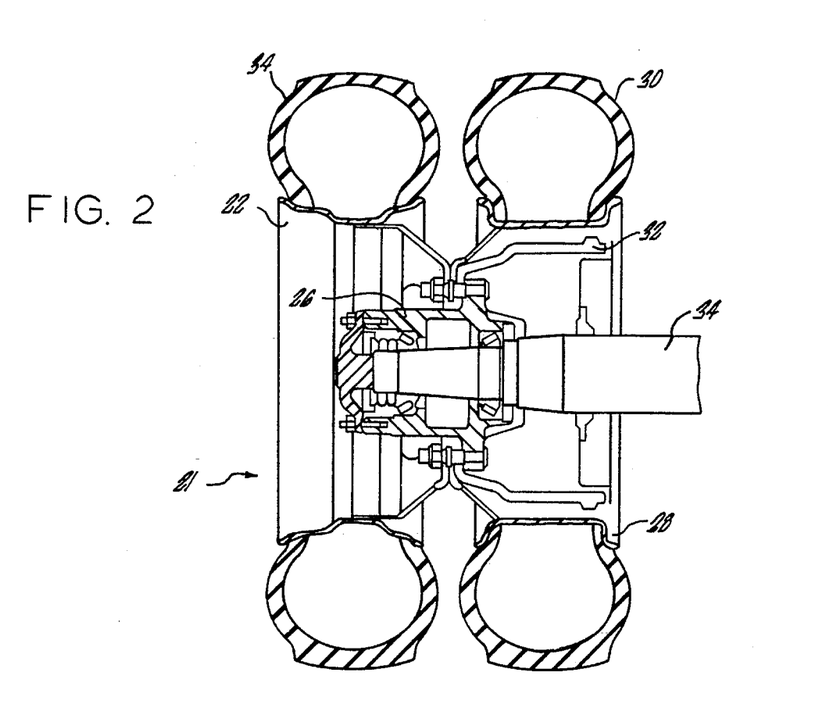
FIG. 2 is an enlarged schematically illustrated section view taken along line 2—2 of FIG. 1.

As shown in FIG. 1, to increase load carrying capacity, many vehicles use tandem wheels. Typically, each tandem wheel axle will have four wheels. FIG. 2 illustrates a typical design for attaching the wheels. An axle 34 is joined to a hub 26. On the axle side of the hub 26 is a brake drum 32. An inner wheel 28 also joined to the hub 24 extends substantially over the brake drum 32 and holds an inner tire 30. An outer wheel 22 having an outer tire 34 is attached to the inner wheel 28.

Figure 4:
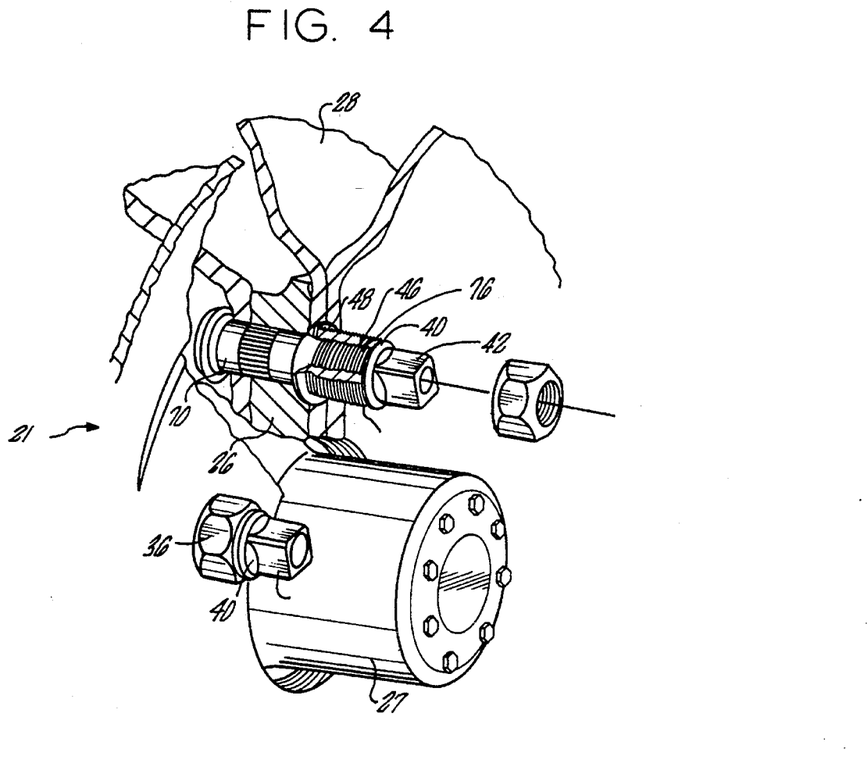
FIG. 4 is an enlarged perspective view fragment in part section of the wheel and hub assembly of FIG. 2.

As shown in FIG. 4, studs 70 pass through the brake drum 32, the hub 24, with a threaded end of the stub protruding through the inner wheel 28 and outer wheel 22. Right bud nuts 40 each have a square end cap 42, outer threads 44, and inner threads 46 engaging the threaded end of the studs 74. (Left bud nuts 41 (FIG. 13) have a similar construction but with left hand inner and outer threads. Similarly, on the left side of the truck, studs 71 have left hand threads.) A flange 48 at the back end of each bud nut 40 holds the inner wheel 28 against the hub 26 as the bud nut 40 is turned onto the stud 70. Clearance holes in the outer wheel 22 are sized to pass freely over the outer threads 44 of the bud nuts 40. Lug nuts 36 thread onto the outer threads 44 of the bud nuts 40 to hold the outer wheel 22 against the inner wheel 28.

Typically, each tandem wheel unit 21 has 10 studs 70 equally spaced on a bolt circle. The studs 70 include a stud head 72 and a non-rotatable (e.g., double D) flange 74 recessed into a corresponding fitting in the brake drum 32, to prevent the studs 70 from rotating. The threaded end of the stud 76 is generally a ¾-16 UNC thread (i.e., 16 threads per inch).

Figures 5, 6:
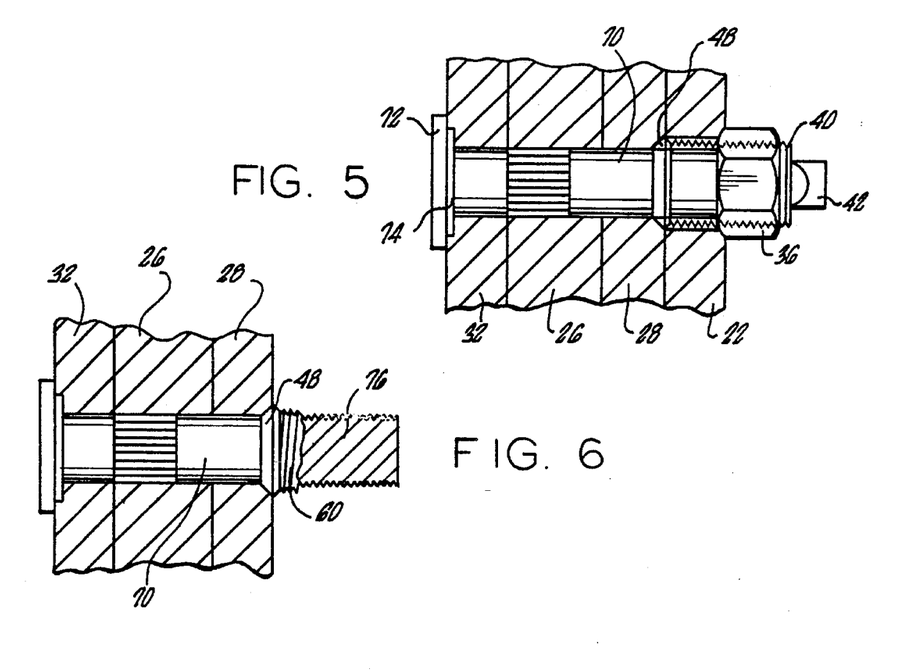
FIG. 5 is an enlarged schematically illustrated fragment view of the stud and bud nut of FIG. 4.
FIG. 6 is an enlarged schematically illustrated fragment view of the stud of FIG. 5 with the outer wheel removed and with the inner wheel held in place by a bud nut segment.

FIG. 5 illustrates a single stud 70 with the adjacent sections of the brake drum 32, the hub 24, the inner wheel 28, and the outer wheel 22. The inner threads 46 of the bud nut 40 threaded onto the threaded end of the stud 76 hold the flange 48 of the bud nut against the inner wheel 28 to secure it in place. The outer wheel 22 passes freely over the outer threads 44 of the bud nut 40 with the lug nut 36 holding the outer wheel 22 on. To remove the outer wheel 22 the lug nuts 36 are unscrewed from the outer threads 44 of the bud nuts 40. After all of the lug nuts 36 have been removed, the outer wheel 22 can be removed by sliding it off over the outer threads 44 of the bud nuts 40. To remove the inner wheel 28, the bud nuts 40 are then unscrewed by applying torque to the square caps 42.

However, if the bud nut 40 becomes seized to the threaded stud end 76 due to corrosion, heat, etc., the bud nut 40 can be sheared off. FIG. 6 illustrates this condition on a tandem wheel unit 21. One of the bud nuts 40 has been sheared off leaving only a bud nut segment 60 over the threaded end of the stud 76. The outer wheel 22 has been removed. However, the inner wheel 28 remains held in place by the flange 48 of the bud nut segment 60. The bud nut segment 60 has virtually no useful gripping surface and can be exceptionally difficult to turn off and remove. Flame cutting is often resorted to remove the bud nut segment 60. However, this risks damaging the stud 70 necessitating even further repairs which typically cannot be made at roadside. Consequently, the shearing of the bud nut 40 can require that a mechanic be called out to the truck to make the repair or that the truck be brought into a service facility for repair.

Figure 3:
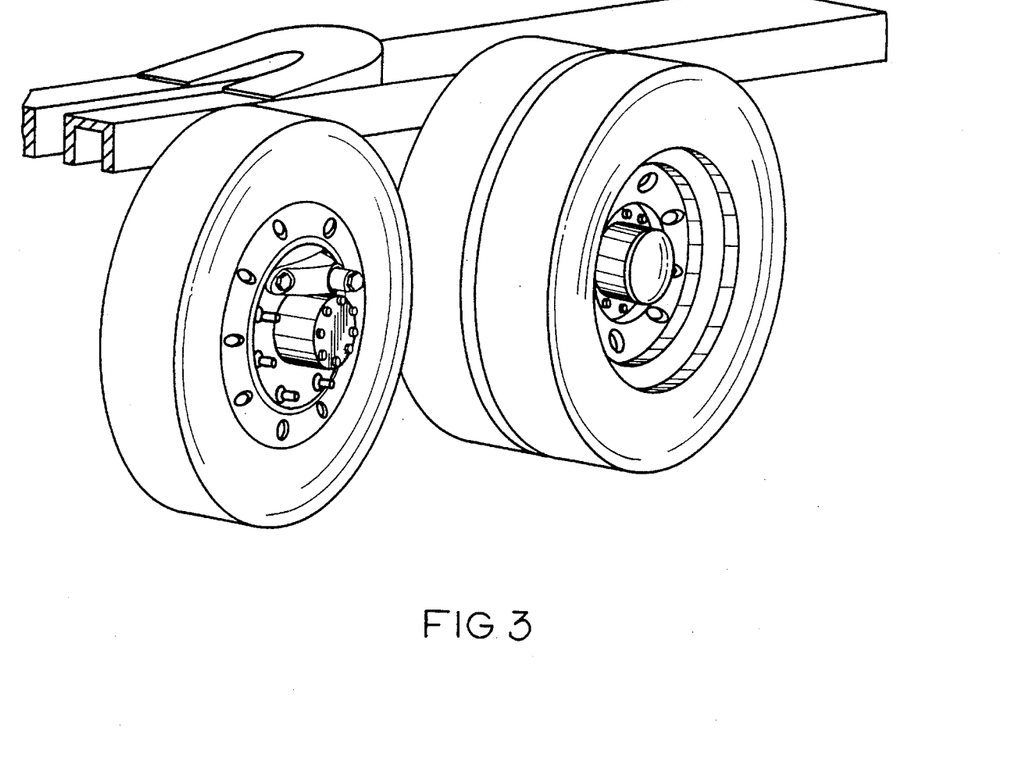
FIG. 3 is a perspective view fragment of a tractor having an outer wheel of a tandem wheel assembly removed and with the present tool installed and ready for use.
Figure 7:
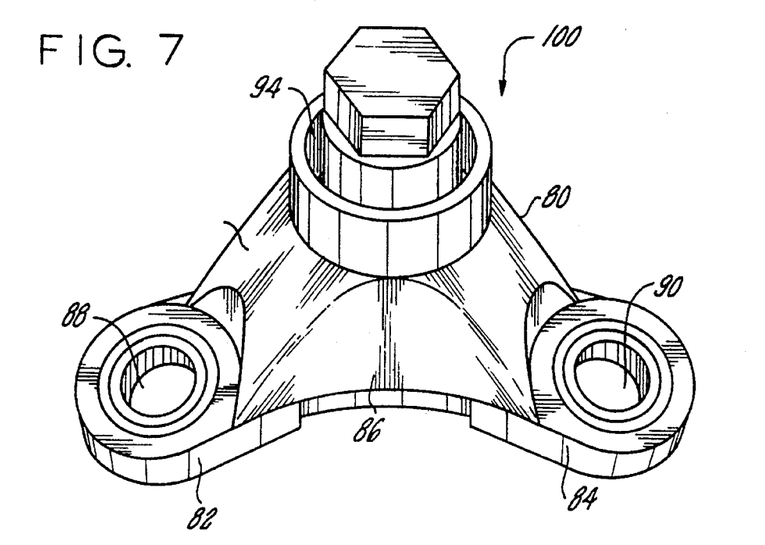
FIG. 7 is a perspective view of a tool for removing the bud nut segment.

Referring to FIGS. 3 and 7, in a preferred embodiment, the present tool 100 has a bracket 80 having a left flange 82 including a left flange through bore 84. Similarly, a right flange 84 has a right flange board 90. The bracket 80 has a radiused inner surface 86 to facilitate positioning the bracket adjacent to the hub extension 27. The bracket body 94 has a center bore 94 having first bracket threads 98 and second bracket threads 102. The bottom surface 94 of the bracket 80 is flat to lie flush against the inner wheel.

Figure 8:
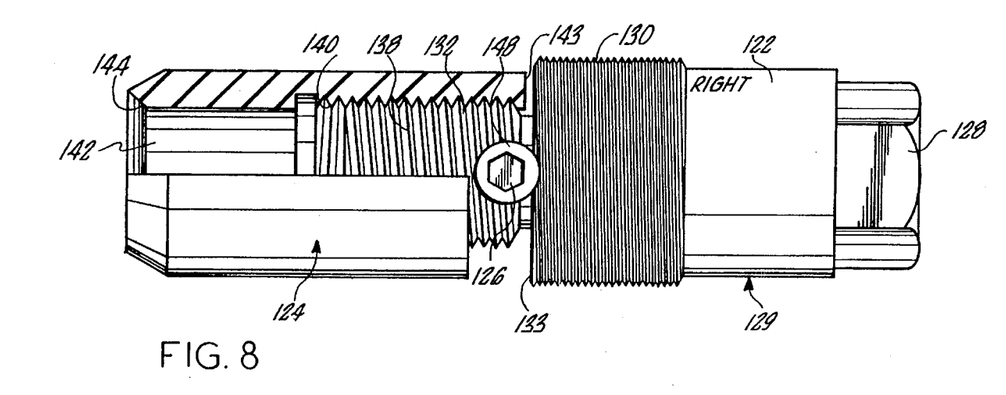
FIG. 8 is an enlarged side elevation view of the remover shown in FIG. 7.
Figure 9:
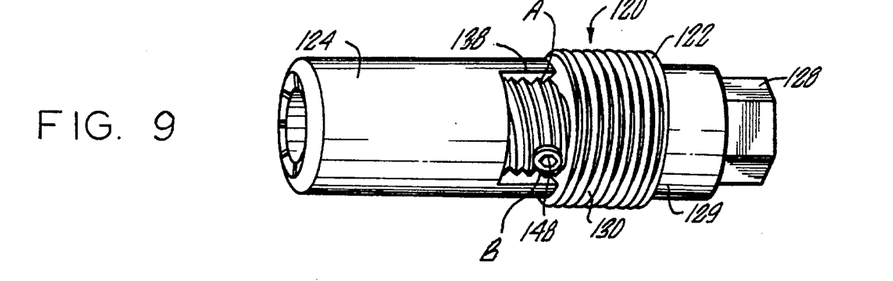
FIG. 9 is a perspective view thereof.

As shown in FIGS. 8 and 9, a right-side remover 120 includes a driver 122 having a body 129 and first driver threads 130 which match the pitch of the threads on the studs 70. The first driver threads 130 mate with the first bracket threads 98. The first driver threads 130 are right-hand threads.

The right or passenger side of the truck has studs 70 having right-hand threads. The right-side remover works on the right-side of the truck only. The bracket 80, having different first and second bracket threads works on both sides.

Figure 11:
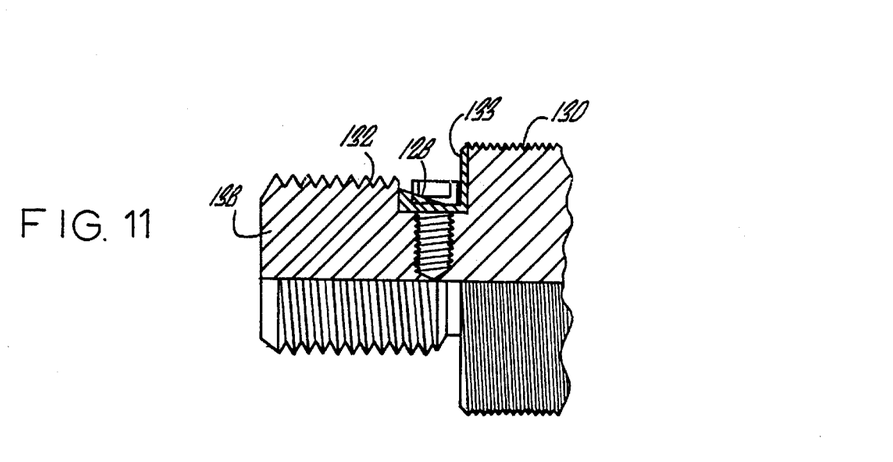
FIG. 11 is an enlarged fragment side elevation view in part section of the driver extension of the remover of FIGS. 8 and 9.

A driver extension 138 extends from the driver body 129 and has second driver threads 132 of a larger pitch than the first driver threads 130. The second driver threads 132 are also right-hand threads. The driver body 129 has a hexcap 128 protruding from the back end.

An engager 124 has internal engager threads 140 that mate with the second driver threads 132 (FIG. 8). An engager bore 142 passes at least partway through the engager 124. At the front end of the engager 124 is an engaging surface 144 having hardened protrusions 145.

Figure 10:
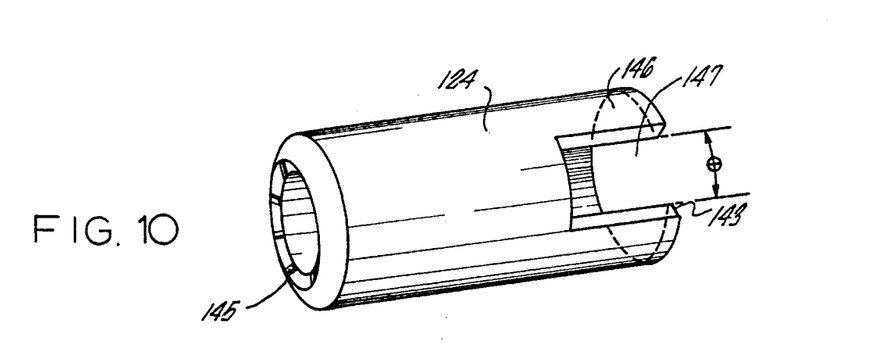
FIG. 10 is an enlarged perspective view of the engager of the remover of FIGS. 8 and 9.

As shown in FIG. 8, 9 and 10, the engager 124 has a sector collar 146 having a cut-out section 147. The sector collar comprises an arc of from 45 to 180 degrees. The engager 124 is threaded into the driver 122 through engagement of the engager threads 140 to the second driver threads 132. A stop or cap screw 148 is threaded into a counterbored threaded hole in the driver extension 138 with the head 150 of the cap screw 148 protruding partially above the second driver threads. Accordingly, the engager 124 can turn or rotate through only a limited angle defined by the cut-out 147, relative to the driver 122. The cap screw 148 can be unscrewed from the driver extension to periodically replace the engager which can be used for between 10 and 40 removal operations before the protruding wear down.

Figure 12:
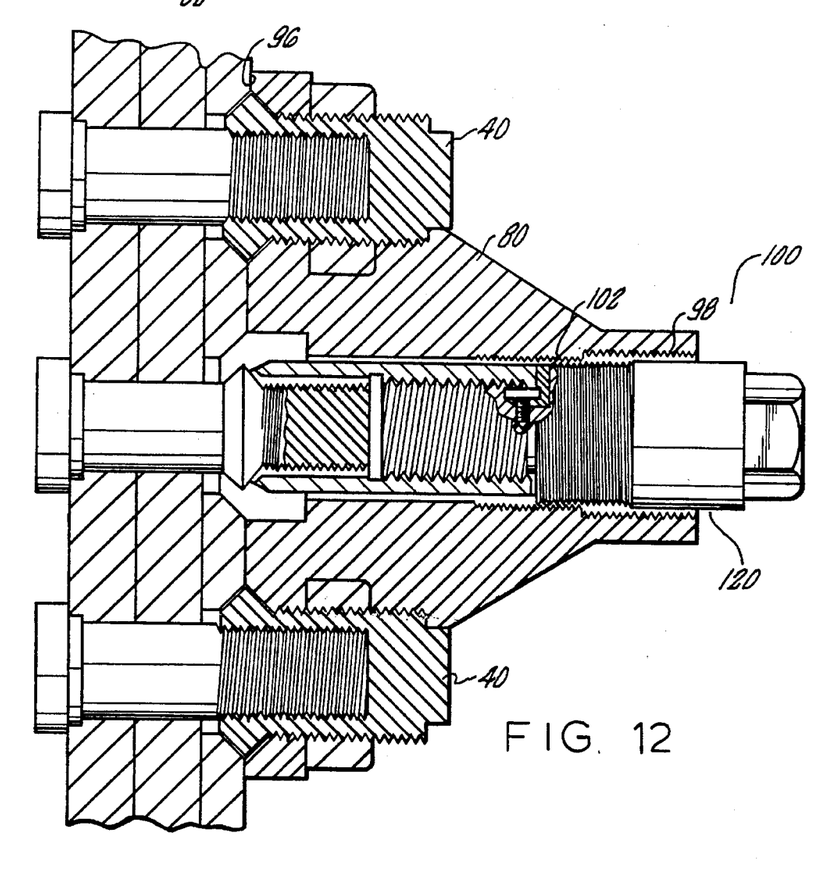
FIG. 12 is a schematically illustrated side elevation view in part section of the tool of FIG. 7 positioned over the bud nut segment of FIG. 6.

To remove an inner wheel 128 being held on by a sheared off nut 40 (i.e., by a bud nut segment 60), the bracket 80 is placed over the bud nut segment 60. Lug nuts 36 are then placed over the outer threads 44 of the bud nuts 40 passing through the left and right flange bores 88 and 90. This installation of the tool is shown in FIGS. 3 and 12.

With the bracket 80 in position, the right side remover 120 is threaded into the bracket 80 with the first driver threads 130 engaging the second bracket threads 102. The right remover 120 is turned by attaching a manual or pneumatic wrench to the hexcap 128 of the driver 122.

The driver 122 is threaded into the bracket 80 until the protrusions 145 of the engaging surface 144 at the front end of the engager 124 contact the flange 48 of the bud nut segment 60. The torque applied to the driver 122 is transferred to the engager 124 by the cap screw or stop 148 which is in position A shown in FIG. 9. As the operator continues to apply torque to the driver 122, the engager presses in and seats against the flange 48 of the bud not segment 60.

The turning direction on the driver 122 is then reversed. As this occurs, the stop or cap screw head 150 swings from position A to position B (FIG. 9). Due to friction, the engager 124 remains stationary along with the bud nut segment 60 while the driver freewheels to the engager.

The engager 124 is dimensioned so that a gap remains between the engager shoulder 143 and the driver body face 133. This ensures that the driver 122 can always turn freely between positions A and B and not bind to the engager 124.

As the driver 122 is backed off or turned in the reverse direction, the engager 124 initially remains stationary with the bud nut segment 60 as the cap screw 148 moves from position A to position B. During this movement from A to B, the engager 124 backs away from the bud nut segment 60 by a dimension determined by the pitch of the first driver threads and the sweep angle θ of the cut-out 147. However, since the second driver threads 132 (engaged with the engager threads 140) are of larger pitch, preferably twice the pitch of the second driver threads 132, the engager 124 is caused to separate further from the driver 122 and is driven and pressed into the flange 48 of the bud nut segment 60.

Specifically, the protrusions 145 dig into the flange 48. The amount of this additional engagement into the flange 48 is determined by the pitch ratio of the second driver threads to the first driver threads and the sweep angle θ. Of course, the first driver threads must match the threads on the stud end 76 to prevent binding as the remover 120 is backed off.

After the cap screw 148 on the driver 122 reaches position B, the driver switches or shifts power from providing a pushing in force to a turning force, and the river 122 and engager 124 turn together as they are backed out of the bracket. However, the engager remains axially pressing very tightly on the flange 48 as the remover 120 is backed out of the bracket 80. Thus, the protrusions 145 of the engager 124 remain tightly pushed in to the flange 48, thereby pressing in on the flange, and also causing it to rotate along with the remover 120, being backed out of the bracket 80. Due to this maintained "compression" force, substantial torque is required to remove the remover as the first driver threads 130 are pressing back on the second bracket threads 102 while the remover 120 is being backed off. The bracket must be rigid enough to withstand the forces without significant bonding.

Figure 13:
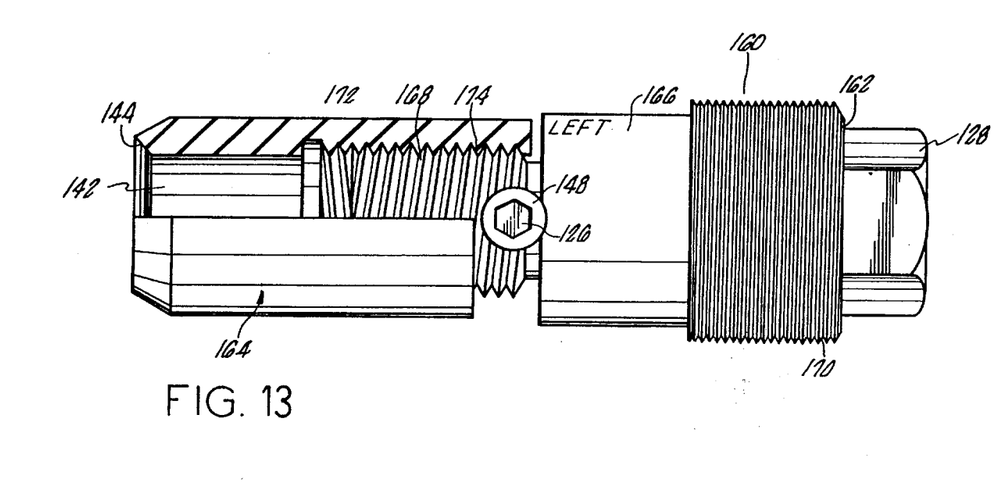
FIG. 13 is an enlarged side elevation view in part section of a left side remover.
Figure 14:
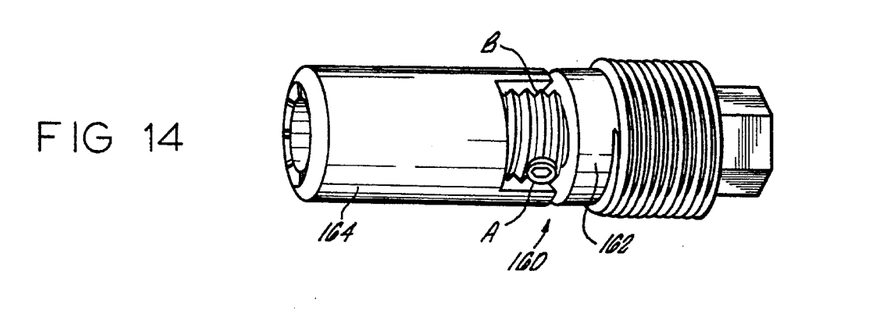
FIG. 14 is a perspective view thereof.
Figure 15:
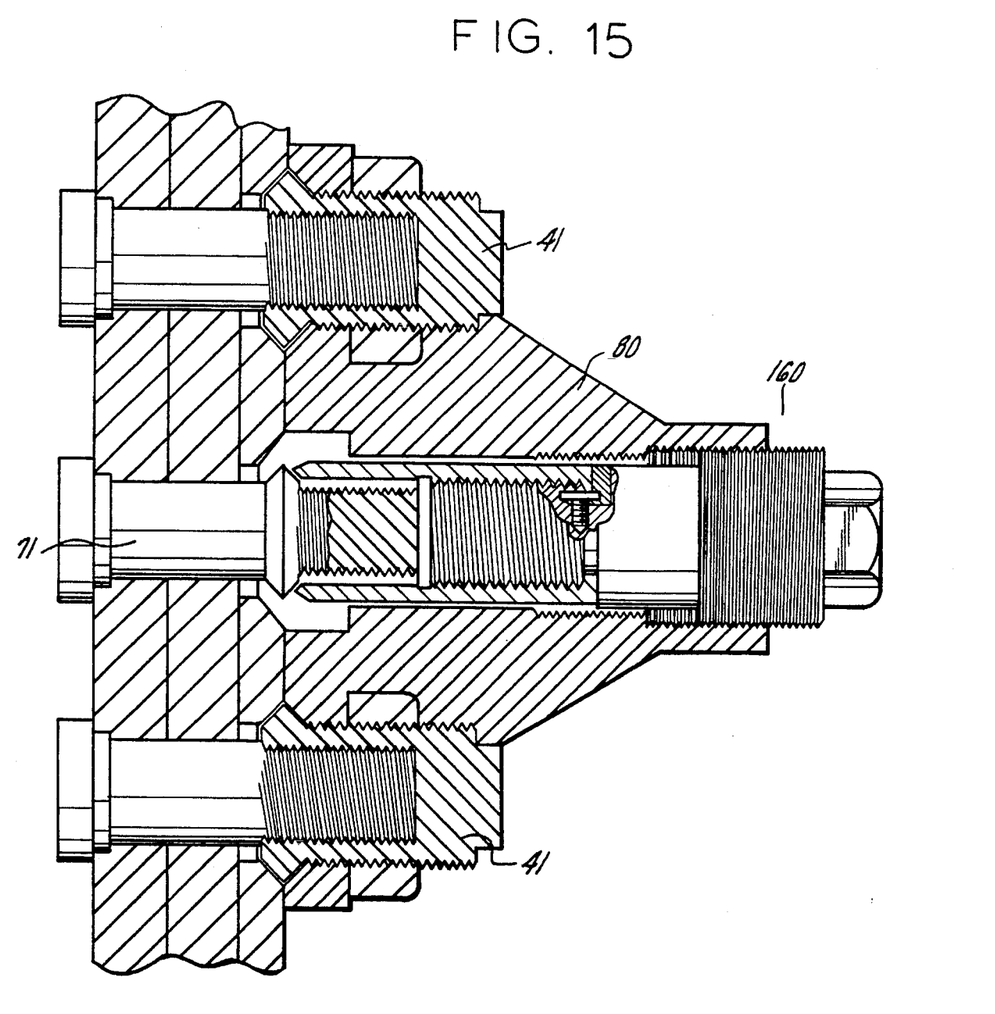
FIG. 15 is a schematically illustrated side elevation view in part section of the remover of FIGS. 13 and 14 in use with the bracket of FIG. 7 to remove a bud nut segment from the left side of a truck.

FIGS. 13 and 14 illustrate a left-side remover 160 having a driver 162 and an engager 164. The left remover 160 is similar the right remover 120, except the thread directions are reversed, i.e., threads 170 and 174 are left-hand threads. The left-side remover 160 is used on the driver's or left side of the truck, which has studs with left-hand threads. Threads 107 match the pitch and direction of the threads on the left studs 71 on the left hand side of the truck. Threads 170 are set back on the remover 160 to mate with the first bracket threads 98 while maintaining the proper axial positioning between the bracket and remover 160. Threads 174 are of larger pitch than threads 170. The bracket 80 is used on both sides of the truck and the removers are selected for use on the left or right side of the truck.

Thus, while a single embodiment has been shown and described, it will be apparent to those skilled in the art that many variations are possible without departing from the spirit and scope of the invention.

What is claimed is:

1. A tool for removing a threaded article comprising:
   a threaded bracket;
   a driver having a first set of threads having a pitch matching the pitch of the threads of the article with the first set of threads threadably engageable to said bracket, and a second set of threads having threads of a larger pitch than the first set of threads;
   an engager threadably engageable to said second set of threads of said driver;
   and means for limiting relative rotation between said driver and said engager.

2. The tool of claim 1 further comprising a tail cap on said driver.

3. The tool of claim 2 wherein said cap is hexagonal.

4. The tool of claim 1 further comprising an engagement surface on said engager.

5. The tool claim 1 wherein said means for limiting relative rotation comprises a collar sector on one of said driver and said engager and a stop on the other of said driver and said engager.

6. The tool of claim 1 wherein said engager has a through bore.

7. The tool of claim 1 wherein said bracket has at least one flange with a through hole.

8. The tool of claim 1 wherein said bracket has a left hand threaded bore section and a right hand threaded bore section of larger diameter than said left hand threaded bore section.

9. The tool of claim 1 wherein said bracket has a central drive bore having at least one threaded section, and a pair of mounting bores with each mounting bore equally spaced apart from said central drive bore.

10. The tool of claim 1 wherein said engager comprises means for engaging a fastener.

11. The tool of claim 10 wherein said means for engaging comprises a plurality of protrusions.

12. The tool of claim 9 wherein said central drive bore and said mounting bores have bore centers located on a bolt circle.

13. A tool for removing a fastener having threads of a first pitch comprising:
- a generally cylindrical driver having a first threaded section of a first diameter and having threads of a first pitch and a second threaded section of a second diameter and having threads of a second pitch, said second pitch being larger than said first pitch, said second diameter being less than said first diameter;
- a generally cylindrical engager having a driver end threadably engaged to said second threaded section and an engagement end opposite said driver end having an indenting surface for engaging a fastener;
- means for limiting rotation between said driver and said engager comprising a sector collar on one of said driver and engager and a stop on the other of said driver and said engager; and
- a bracket threadably engageable to said first threaded section of said driver.

14. The tool of claim 13 further comprising a hexagonal tail cap on said driver.

15. The tool of claim 13 wherein said engager has a bore extending at least part way through it.

16. The tool of claim 13 wherein said first and second threaded sections have external threads, and said engager has internal threads.

17. The tool of claim 13 wherein said indenting surface comprises a hardened irregular surface.

18. The tool of claim 13 wherein said second pitch is approximately twice said first pitch.

19. The tool of claim 13 wherein said sector collar comprises an arc of from 45 to 180 degrees.

20. A method of removing a threaded article comprising the steps of:
- securing a threaded bracket in alignment with the threaded article;
- turning a remover in a forward direction through the threaded bracket causing an engager at one end of the remover to forcibly engage the article; and
- turning the remover in a reverse direction while the engager remains engaged with the article, thereby further driving the engager against the article through an interaction of threads of different pitch between the engager and the remover, and continuing to turn the remover together with the engager thereby causing the article to turn in the reverse direction and allowing the article to be removed.

* * * * *